United States Patent

[11] 3,597,053

| [72] | Inventor | Gary J. Mastman<br>5150 Graves St., San Jose, Calif. 95129 |
|---|---|---|
| [21] | Appl. No. | 837,180 |
| [22] | Filed | June 27, 1969 |
| [45] | Patented | Aug. 3, 1971 |

[54] SPECTACLE FRAME HAVING HEAD CONFORMABLE PORTIONS
8 Claims, 11 Drawing Figs.

[52] U.S. Cl........................................... 351/41,
264/222, 264/322, 351/83, 351/111, 351/136, 351/177
[51] Int. Cl........................................... G02c 1/00
[50] Field of Search........................................... 351/41,
82—83, 117, 122, 124, 126, 136, 139, 177, 111;
264/222, 239, 322

[56] References Cited
UNITED STATES PATENTS

| 2,259,082 | 10/1941 | Ring | 351/122 |
| 2,436,101 | 2/1948 | Dirlam et al. | 351/122 |
| 2,561,403 | 7/1951 | Nelson | 351/82 |
| 2,664,025 | 12/1953 | Herman | 351/160 X |
| 2,917,774 | 12/1959 | Archer | 264/222 X |

*Primary Examiner*—David Schonberg
*Assistant Examiner*—John W. Leonard
*Attorney*—Townsend and Townsend ABSTRACT: A spectacle frame having a nose portion and a pair of temples, with the nose portion and the temples having surfaces which normally engage the nose, head and ears when the frame is worn. A material is applied in layers to the surfaces of the nose portion and temples which normally engage the nose, head and ears. The material is of a type which conforms to the nose, head or ears when the material is at a predetermined temperature and when the frame is placed on the wearer. In one embodiment, the material is conformable at ambient temperatures and in another embodiment, the material is thermoplastic and becomes conformable upon being heated to a relatively low temperature above ambient temperatures.

PATENTED AUG 3 1971  3,597,053

INVENTOR.
GARY J. MASTMAN
BY Townsend and Townsend
ATTORNEYS

SPECTACLE FRAME HAVING HEAD CONFORMABLE PORTIONS

This invention relates to improvements in eyeglasses and, more particularly, to a spectacle frame having means thereon to permit the same to be readily fitted to a wearer.

The present invention is directed to the use of a material at certain locations on a spectacle frame for providing means for complementally engaging certain facial and head surfaces, whereby the frame will be properly fitted to the wearer. To this end, the material is applied to the nose portions and temples of the frame for engaging the nose, head and ears when the frame is worn. The material can be of the type which is substantially in a liquid state at ambient temperatures or it can be of a type which is thermoplastic and becomes conformable at a relatively low temperature above ambient temperatures. If the first type of material is used, it will be held in a closed, flexible container or cell and will immediately conform to the anatomical part of the wearer when the frame is placed on the wearer. It is preferred that this type be used only on the nose portions of the frame and that thermoplastic material, the second type, be used on the temples.

The second type of material, thermoplastic material, is mounted in layers on the nose portions and temples of a frame and is permanently fitted to the wearer by placing the layers in conformity with respective surface areas of the nose, head, and ears after the layers have been heated to a relatively low temperature above ambient temperatures. In this way, the layers are rendered comformable, moldable or sufficiently soft so that the layers can be urged against these surface areas and assume the surface contours thereof. Upon removal of the frame, the heated layers are allowed to cool and thereby set to a hardened condition with the material layers remaining in conformity with such surface means, following which the frame is ready for use and will remain properly fitted to the particular wearer during normal usage notwithstanding the presence of body heat and the heat due to ambient temperatures.

The present invention eliminates the usual problems associated with the fitting of eyeglasses. Such problems include the adjusting of nose portions and temples of a spectacle frame so that these parts are positioned to prevent the frame from slipping forwardly or to the side. To achieve this, the nose portions oftentimes must be caused to grip the nose and the temples must either be curved around the back of the ears or must be bent so that they tightly grip the sides of the head. These expedients are generally undesirable because the frames are uncomfortable on the wearer due to the gripping pressures exerted by the nose portions and the temples.

The present invention eliminates the need for such expedients by using the material mentioned above to accurately conform to the surface areas of the nose, head and ears. In this way, relative movement between the head and the spectacle frame is almost substantially eliminated because of the comformity between the layers and the adjacent surface areas engaged thereby. Thus, the spectacle frame, when worn, is held in its proper location with respect to the eyes.

The primary object of this invention is to provide improvements in the fitting of eyeglasses wherein material applied to the nose portions and temples of a spectacle frame is caused to conform to the nose, head and ears of the wearer when the eyeglasses are worn and when the material is at a predetermined temperature so as to provide a fit which substantially eliminates movement of the frame relative to the head.

Another object of this invention is the provision of a spectacle frame and a method of fitting the same wherein a number of layers of thermoplastic material on the nose portions and temples of the frame can be heated to a relatively low temperature at which the material becomes softened, whereby the layers can become moldable for complementally engaging the nose, head and ears of the wearer of the frame without causing discomfort to the wearer during a fitting operation to thereby simplify the fitting step as well as to provide a properly fitted frame which maintains its fit during normal usage.

A further object of this invention is to provide a spectacle frame having a pair of nose portions each provided with a device including a closed, flexible cell-like container which holds a material in a substantially liquid state at ambient temperatures so that the devices will conform to the nose when the frame is worn and thereby provide a fit which minimizes or substantially eliminates movement of the frame relative to the nose.

Other objects of this invention will become apparent as the following specification progresses, reference being had to the accompanying drawings for illustrations of several embodiments of the invention.

A first embodiment of the invention is illustrated in FIGS. 1, 2 and 2a with respect to a spectacle frame 10 having a pair of lens-holding portions 12, a pair of nose-engaging portions 14 carried by portions 12 and a pair of temples 16 hingedly secured to portion 12 at the sides thereof. In the first embodiment, thermoplastic material is used on each of nose portions 14 and temples 16 at locations where the latter would ordinarily engage certain areas of the nose, head and ears of the wearer of the frame. Such material is normally solidified at ambient temperatures and can be conditioned to conform permanently to the aforesaid nose and head areas as hereinafter described, whereby the frame will be properly fitted to the wearer and will remain so fitted during continued normal usage of the frame. Thus, the invention permits eyeglasses to be worn without having the temples or nose portions tightly engaging the head and nose as is oftentimes necessary when conventional eyeglasses are worn.

To achieve the foregoing purpose, nose portions 14 are provided with respective layers 18 of a thermoplastic material which is in a relatively rigid, solidified or hardened state at ambient temperatures but, when heated to a predetermined temperature above ambient temperature, it becomes softened sufficiently to permit the material, when the frame is placed on the wearer, to be urged against the nose and to conform to the nose contours on opposite sides thereof. After the nose contours have been formed in layers 18, the frames are removed from the wearer and the material is allowed to set once again to its normally hardened condition.

When frame 10 is worn in a normal manner, layers 18 will at all times remain in conformity with the nose contours and will thereby properly position lens-holding portions 12 with respect to the eyes.

Figure 1:
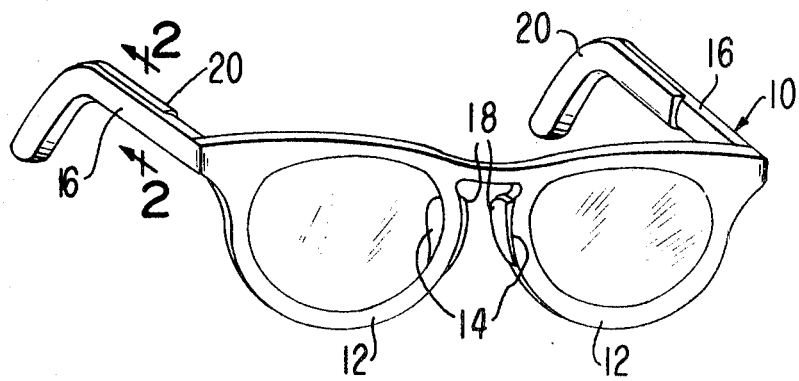
FIG. 1 is a perspective view of a spectacle frame showing one form of the material layers for conforming to the nose and head of the wearer of the frame.
Figure 2:
FIG. 2 is a cross-sectional view of the frame taken along line 2-2 of FIG. 1 showing a temple of the frame before the latter is fitted to the wearer.

Each temple 16 is also provided with a layer 20 of the same material as that used in layers 18. Each layer 20 has first and second segments 22 and 24 on the inner and bottom surfaces, respectively, of the corresponding temple as shown in FIG. 2. Segment 22 is provided to engage the side areas of the head immediately forwardly of, above, and rearwardly of the ear. Segment 24 is provided to engage the top and back areas of the ear. The lengths of segments 22 and 24 are selected so that they are located at those positions along the temple which are adjacent to the head and ear areas which would normally be engaged by the temple.

Any suitable means can be utilized to couple layers 18 and 20 to nose portions 14 and temples 16, respectively. For instance, a suitable adhesive can be applied at the interface between each layer and the corresponding frame part. For purposes of illustration, a layer of adhesive can be applied at the interface 26 (FIG. 2) between layer 20 and the corresponding side and bottom faces of temple 16.

Layers 18 and 20 are applied to frame 10 at any time such as at the time the frames are made or at the time immediately preceding the fitting of the frames to the wearer. Assuming that the layers have been applied to the frame, the frame is ready to be fitted to the wearer. To accomplish this, layers 18 and 20 are heated to a temperature at which the material of the layers becomes softened and pliable. This can be done by any suitable heat source such as by heat lamps or the like.

When the material has softened sufficiently to permit fitting, the frames are placed on the wearer and adjusted so that lens-holding portions 12 are at their proper locations. During this step, layers 18 and 20 are urged against the nose, head and ears of the wearer to cause the softened layers to conform to these areas and thereby provide the desired fit of the frame to the wearer. When the fitting has been completed, the frames are removed from the wearer and the layers of material are allowed to set to a hardened condition. A suitable means can be used to cool the layers, if desired, to accelerate the setting of the material. After the material has set to a hardened condition, it will remain so during normal use of frame 10. The layers can be sprayed with a thin film of a suitable thermoplastic material so as to protect the surfaces of layers 18 and 20 and the thin film can be of a specific color, if desired.

Figure 2A:
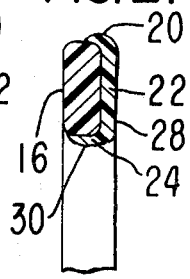
FIG. 2a is a view similar to FIG. 2 but showing the condition of the temple after it has been fitted to the wearer.

FIG. 2a illustrates, in a somewhat exaggerated manner, the way in which segments 22 and 24 may possibly be configured after the frame has been properly fitted. Segment 22 is shown as having an irregular outer surface 28 which conforms to the adjacent area at the side of the head while segment 24 has an irregular surface 30 which conforms to the adjacent area at the back of the ear. In a similar manner, layers 18 will have surfaces which may or may not be irregular depending upon the bone structure of the nose of the wearer.

One of the characteristics of the material which is used to form layers 18 and 20 is that it becomes softened or moldable when it is heated to a relatively low temperature. The reason for this is that the temperature at which softening or moldability occurs is not so high as to burn the skin of the wearer or otherwise cause discomfort during the fitting operation. For this purpose, the material preferably should reach the effective softened condition when the temperature is in the range of 140°—160° F. In this range, the wearer generally suffers, at most, only minor discomfort and has no adverse skin reaction resulting from the fitting step. Moreover, to complete the fitting step requires only a minimum of time, of the order of 5 to 10 seconds normally, so that layers 18 and 20, at their elevated temperatures, are not in contact with the skin for any appreciable amount of time.

Another characteristic of the material is that it maintains its outer surface configuration after it has set to a hardened condition following the fitting step even though the material absorbs heat from the head when the frame is worn. As an additional safeguard, the material can be coated with a thin film of thermoplastic resin to further assure that the outer surface configuration thereof will be maintained, especially if the thin film provides an insulating layer and has relatively high melting temperature. Thus, the material of layers 18 and 20 can have a relatively lower softening temperature but still be protected by the film which has a relatively high melting temperature.

Any suitable thermoplastic material can be used to form layers 18 and 20. A material which has been found to be usable for this purpose is a compound known as conformal plastic manufactured by International Shoe Company at its Rubber Division in Bryan, Texas. This material lends itself to application to nose portions and temples of spectacle frames because it can be secured by a suitable adhesive to these frame parts. This material is easy to work with and can be cut to size as well as being initially at the proper thickness for application for the nose portions and temples of a frame. This material normally is in a relatively hardened, self-sustaining condition and when heated to a temperature in the range of 140° F. to 160° F., it becomes sufficiently softened and pliable to permit it to be molded to the outer surface configurations of the nose, the sides of the head, and the top and back sides of the ears. Thereafter, once the material has been fitted and allowed to set to a hardened condition, it substantially maintains its outer surface configuration in conformity with the corresponding part of the face or head which it is to engage. When a suitable thin film of thermoplastic material is applied to the exposed surface areas of conformal plastic, the latter will provide a layer of insulation when the material is in the vicinity of heat source.

Figure 3:
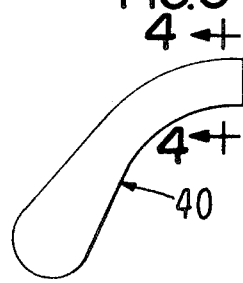
FIG. 3 is a fragmentary, side elevational view of the rear end of a temple showing a second form of a material layer.
Figure 4:
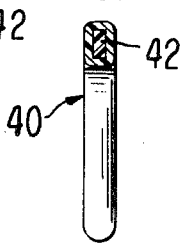
FIG. 4 is a cross-sectional view taken along line 4-4 of FIG. 3.

The foregoing description relates to the way in which the above material is applied in layers to the nose portions and temples of a frame. The material can be applied in other ways as well. For instance, FIG. 3 shows a tubular member or sleeve 40 mounted on the end of a temple 42 with sleeve 40 being formed of a thermoplastic material having the same characteristics as those mentioned above. As shown in FIG. 4, sleeve 40 surrounds temple 42 and can be caused to adhere thereto by a suitable adhesive. The fitting of the frame of which temple 42 is a part is accomplished in the manner described above with respect to frame 10. Thus, after sleeve 40 is heated, the frame is placed on the wearer and the sleeve and temple are urged against the head and ear so that the adjacent side and bottom surfaces of sleeve 40 moves into conformity with the adjacent head and ear areas. The frame is then removed from the wearer and the sleeve is allowed to set to a hardened condition whereupon the frame will be ready for use. Also, the outer surface of the sleeve can be provided with a thin film of thermoplastic material as mentioned above for use as a protective layer on the sleeve.

Figure 5:
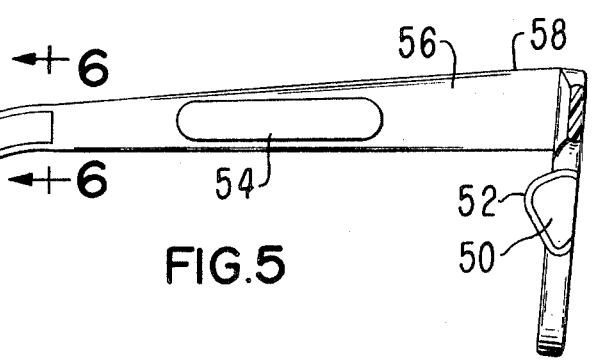
FIG. 5 shows a spectacle frame in cross section and illustrates a third form of material layer of the invention.

A third way of utilizing the thermoplastic material in the present invention is to make the material layers in the forms of pads for application to those portions of a spectacle frame which normally engage the nose, head and ears when the frame is worn. For instance, FIG. 5 illustrates that a first, nose-engaging pad 50 can be applied to a nose portion 52, a second, head-engaging pad 54 applied to a central part 56 of a temple 58, and a third, ear-engaging pad 60 applied to the outer end of temple 58. Each pad can be secured in some manner, such as by a suitable adhesive, to the corresponding frame part and can be heated as described above so as to render it sufficiently soft to permit fitting of the pad on the wearer. Pad 54 will be provided for engaging the side of the head. Pad 60 will be provided to engage the top and back side of the corresponding ear. To this end, the configuration of pad 60 will be similar to layer 20 of FIG. 2 in that it will have a side segment as well as a bottom segment.

Figure 6:
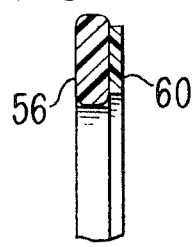
FIG. 6 is a cross-sectional view taken along line 6-6 of FIG. 5.

The fitting of a spectacle frame having pads 50, 54 and 60 thereon follows sufficiently the same steps as that disclosed above with respect to frame 10. FIG. 6 illustrates how pad 60 underlies the bottom surface of temple 58 at its outer end.

Figure 7:
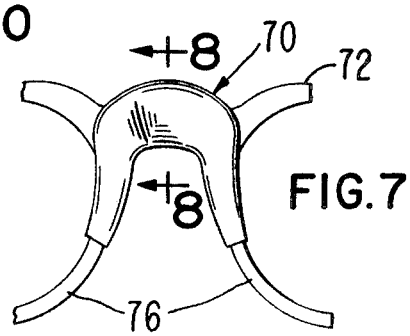
FIG. 7 is a fragmentary, rear elevational view of a spectacle frame showing another embodiment of a material layer of the bridge of the frame.
Figure 8:
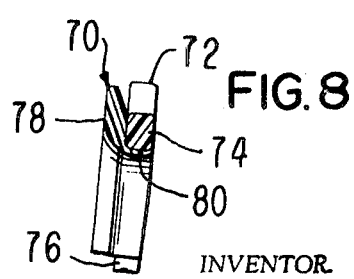
FIG. 8 is a cross-sectional view taken along line 8-8 of FIG. 7.

FIGS. 7 and 8 show a bridge 70 provided at the central part of a spectacle frame 72. Bridge 70 is formed from the material having the above characteristics and has an inverted U-shaped configuration for application to the cross piece 74 of frame 72 and to the convex frame parts 76 which are used to hold the lenses in the frame. Bridge 70 has a U-shaped rear segment 78 and a U-shaped bottom segment 80 integral with segment 78.

Segment 80 underlies crosspiece 74 and extends along the inner surfaces of frame parts 76. Segment 78 engages the rear face of crosspiece 74 and extends along the rear faces of frame parts 76. A suitable adhesive can be used to secure bridge 70 to crosspiece 74 and frame part 76.

When bridge 70 is mounted on a spectacle frame, it is fitted to the nose of a wearer by heating the bridge until it becomes softened or pliable. Then the frame is put on the wearer and the softened bridge is urged onto the nose to thereby cause the bridge to conform to the outer surface of the nose. After the material has set, the surfaces of segments 78 and 80 will complementally engage the nose each time the frame is worn, whereby the frame will be properly fitted at all times. The bridge can then be sprayed with a thin film of thermoplastic material to protect the same as described above.

The material layers of the present invention can be applied to all existing spectacle frames and can be parts of the frame themselves when the latter are made. The teachings of the invention allow a particular frame to be properly fitted on a individual wearer so that the frame does not slip forwardly thereby necessitating periodic movement of the frame rearwardly and toward the eyes. The invention also eliminates the need of using stresses or pressure on the nose portions and temples to be clamped against the sides of the head of the wearer and thereby avoids discomfort due to this approach.

The present invention also contemplates the use of a material which is substantially in a liquid state at ambient temperatures. Such a liquid state also includes a jellylike consistency wherein there is movement of the material when it is urged in a predetermined direction upon compression of a flexible sack or container which holds the material. Glycerine, viscose material and the like are suitable for materials used in this way with the present invention.

Figure 9:
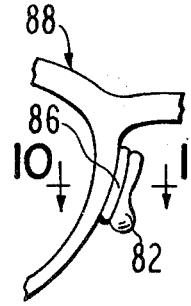
FIG. 9 is a fragmentary rear elevational view of a spectacle frame having a liquid-containing cell on a nose portion thereof.
Figure 10:
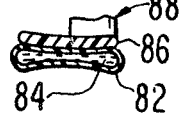
FIG. 10 is a cross-sectional view taken along line 10-10 of FIG. 9.

To illustrate how this can be done, FIGS. 9 and 10 show a closed, flexible cell 82 which holds a mass 84 of a material in a generally liquid state. Container 82 may be of a suitable plastic which is sufficiently flexible to permit the container and the liquid material therein to readily conform to an anatomical part of the head when the unit is utilized with the present invention.

FIG. 9 shows that container 82 is secured in any suitable manner, such as by an adhesive, to a nose portion 86 forming a part of a spectacle frame 88. The frame will have another nose portion (not shown) and the other nose portion will have a container 82 secured thereto, whereby both containers will engage respective sides of the nose when the frame is worn.

It is preferred that the liquid material encased in containers 82 be utilized on nose portions 86. In such a case, the temples of frame 88 will be provided with thermoplastic material in the manner described above. The thermoplastic material will be fitted by first heating such material to a softening or flowable temperature, following which the frame is put on the wearer and the material on the temples urged against the head and ears to conform to the adjacent surfaces thereof.

The container with liquid material as shown in FIGS. 9 and 10 will immediately conform at all times to the nose surface of the wearer, since the material remains substantially liquid or flowable at ambient or room temperatures. The liquid will gravitate to the lower extremity of the container when the frame is not in use on the wearer, but the container will immediately flex when engaged by the nose and this flexing action will cause a displacement of the liquid in the container sufficiently to cause the container and liquid to immediately conform to the nose surface. By conforming in this way, the container and liquid will provide a proper fit of the frame on the nose of the wearer, and each container and its enclosed liquid will form essential parts of a respective nose portion.

The liquid and container concept can be utilized on the temples in combination with containers and liquid on the nose portions. Moreover, the liquid and container concept can be used on the temples of the frame while thermoplastic material layers are used on the nose portions.

Each container 82 can be filled with liquid 84 in any suitable manner. For instance, the container can be made from a material which can be pierced with a hypodermic needle, the needle operating to inject the proper volume of liquid into the container when the latter is closed and initially empty. The container could be filled with the proper volume of liquid and then sealed, if desired.

FIG. 9 shows how the liquid is disposed in the container when the frame is not being worn. FIG. 10 shows how the liquid and container might be configured when the frame is worn.

I claim:
1. In a spectacle frame of the type having a nose piece and a pair of temples, the improvement comprising: first means attachable to said nose piece for engaging the opposite side of the nose of the wearer of the frame; and second means attachable to each temple, respectively, for engaging the head adjacent to the corresponding ear of the wearer, each of said first means and said second means including a mass of material which is relatively rigid at ambient temperatures and is conformable to the nose or head when the material is in the range of 140°—160°.

2. In a spectacle frame as set forth in claim 1, wherein each of said first means and said second means includes a layer having a pair of opposed surfaces, one of said surfaces having means thereon for attaching the same to said frame.

3. In a spectacle frame as set forth in claim 1, wherein said first means comprises a bridge element formed from said material and having a pair of spaced, nose-engaging members and means interconnecting said members.

4. In a spectacle frame as set forth in claim 1, wherein said second means includes a first head-engaging portion and a second ear-engaging portion.

5. In a spectacle frame as set forth in claim 2, wherein said portions are integral with each other.

6. In a spectacle frame as set forth in claim 2, wherein said portions are spaced apart.

7. In a spectacle frame as set forth in claim 2, wherein said second means includes a sleeve receivable over the end of the corresponding temple.

8. In combination, a spectacle frame having a pair of nose portions and a pair of temples; a first layer of material on each of said portions, respectively, the first layers being disposed to engage respective sides of the nose when the frame is worn; and a second layer of material on each of said temples, respectively, each second layer being disposed to engage a corresponding side of the head and the adjacent ear when the frame is worn, said material being relatively rigid at ambient temperatures and conformable to the nose or head when the material is in the range of 140°—160°.